(12) United States Patent
Sao et al.

(10) Patent No.: US 7,540,911 B2
(45) Date of Patent: Jun. 2, 2009

(54) INK COMPOSITION, INK SET, INK CARTRIDGE USING THE INK COMPOSITION, INKJET RECORDING METHOD AND RECORDED MATERIAL

(75) Inventors: Akihito Sao, Matsumoto (JP); Hidefumi Maruyama, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 12/074,788

(22) Filed: Mar. 5, 2008

(65) Prior Publication Data

US 2008/0220168 A1 Sep. 11, 2008

(30) Foreign Application Priority Data

Mar. 9, 2007 (JP) ............................. 2007-059913

(51) Int. Cl.
*C09D 11/02* (2006.01)
*B41J 2/01* (2006.01)
(52) U.S. Cl. .................. 106/31.58; 106/31.59; 347/100
(58) Field of Classification Search ............. 106/31.58, 106/31.59; 347/100
See application file for complete search history.

(56) References Cited

U.S. PATENT DOCUMENTS

| 6,821,329 | B2 * | 11/2004 | Choy ....................... 106/31.58 |
| 7,048,789 | B2 * | 5/2006 | Taguchi et al. ............ 106/31.58 |
| 7,077,894 | B2 * | 7/2006 | Taguchi et al. ............ 106/31.58 |
| 7,416,592 | B2 * | 8/2008 | Kitamura et al. .......... 106/31.58 |
| 2007/0261597 | A1 * | 11/2007 | Sao et al. ...................... 106/38 |
| 2007/0263058 | A1 * | 11/2007 | Sao et al. .................. 106/31.58 |

2008/0145562 A1 * 6/2008 Kitamura et al. ......... 106/31.48

FOREIGN PATENT DOCUMENTS

JP 2006-255933 9/2006
JP 2006-312331 11/2006

* cited by examiner

*Primary Examiner*—Helene Klemanski
(74) *Attorney, Agent, or Firm*—Edwards Angell Palmer & Dodge LLP; John J. Penny, Jr.; Weiying Yang

(57) ABSTRACT

An ink composition having, as essential components, at least a diacetylene tetraol compound represented by general formula (1) below and a glycol ether represented by general formula (2) below:

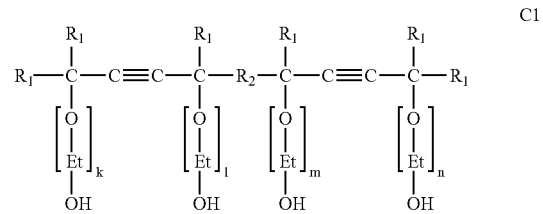

(wherein $R_1$ and $R_2$ each independently represent $C_{1-3}$ alkyl groups, —O-Et- represents oxyethylene, and k, l, m and n are each integers from 0 to 2);

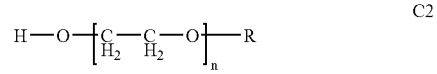

(wherein R represents a $C_8$ alkyl group, and n is an integer from 4 to 8).

7 Claims, No Drawings

INK COMPOSITION, INK SET, INK CARTRIDGE USING THE INK COMPOSITION, INKJET RECORDING METHOD AND RECORDED MATERIAL

This application claims priority from Japanese Patent Application No. 2007-059913, filed on Mar. 9, 2007, the contents of which are incorporated herein.

BACKGROUND

1. Technical Field

The present invention relates to an ink composition that can provide a beautiful recorded material with stable discharge in higher-speed printing environments, to an ink set using an ink composition with these properties as one component, to an inkjet recording method using this ink set, and to a beautifully recorded material obtained by this recording method.

2. Related Art

Inkjet recording is a printing method whereby printing is accomplished by discharging droplets of ink from a fine nozzle head so that they fly through the air and adhere to a paper or other recording medium. The advantage of this method is that it allows high-resolution, high-quality images to be printed at high speeds using relatively simple equipment. Inkjet recording units using this method are widely used in the industry because they provide good printing quality at a low cost with relatively quiet operation and graphic formation ability. In particular, thermal (Bubble Jet®) and piezoelectric drop-on-demand printers have had great commercial success, and are widely used as computer printers in offices and homes.

The inks used in inkjet recording may be obtained for example by dissolving a dye as the coloring material in an aqueous solvent, but inks have also been proposed that are obtained by dispersing a pigment with a surfactant or polymer dispersant in an aqueous solution. A recent practice is to form color images by inkjet recording using ink sets consisting of multiple ink compositions. In general, color images are formed with 3 colors—a yellow ink composition, a magenta ink composition and a cyan ink composition—or in some cases with 4 colors including a black ink composition in addition to these. There are also cases in which color images are formed with 6 colors, including a light cyan ink composition and a light magenta ink composition in addition to the other 4, or with 7 colors, including a dark yellow ink composition in addition to the other 6. In multicolor printing using multiple color ink compositions consisting of different coloring materials, multiple coloring materials are mixed on the recording medium, providing uniform color development to create beautiful printed materials without color irregularities.

In recent years, "photographic quality" printing using color inkjet printers has reached a level equivalent to that of "silver salt photography" thanks to continuous improvements in heads, ink compositions, recording methods and media. In particular, by reducing the volume of the discharged ink droplets it has been possible to reduce graininess, which is indispensable for achieving photographic quality. Various proposals have also been made from time to time for increasing printing speed, as well as for improving head responsiveness and grading the weight of the ink droplets (JP-A-2006-255933, JP-A-2006-312331).

However, such increases in printing speed have also increased ink flow rates, leading to more contamination or generation of bubbles in the head channel. This interferes with normal discharge, leading to dot skipping in the image on the recording paper, and detracting from the image quality, so such bubbles need to be eliminated from the channel.

SUMMARY

An aspect of the present invention therefore provides an ink composition whereby bubble adhesion in the ink channel is reduced to thereby allow normal discharge, along with an inkjet recording ink using an ink composition with these properties, and a beautiful recorded material obtained by this recording method.

The inventors in this case arrived at the present invention as a result of exhaustive research into normal discharge in inkjet recording using multiple ink compositions combining various solubilizers and surfactants that are useful as wetting agents in ink compositions, upon discovering that normal discharge could be achieved in a high-speed printing environment and a beautiful printed material obtained by inkjet printing by means of an ink composition containing at least a glycol ether and a diacetylene tetraol with a specific structure as essential components.

The inventors achieved this objective by providing the following inventions, which are based on this discovery.

1. An ink composition having, as essential components, at least a diacetylene tetraol compound represented by general formula (1) below and a glycol ether represented by general formula (2) below:

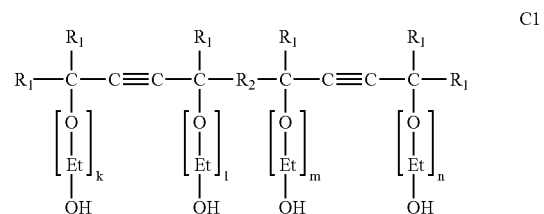

(wherein $R_1$ and $R_2$ each independently represent $C_{1-3}$ alkyl groups, —O-Et- represents oxyethylene, and k, l, m and n are each integers from 0 to 2);

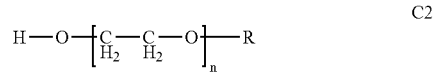

(wherein R represents a $C_8$ alkyl group, and n is an integer from 4 to 8).

2. The ink composition according to 1 above, wherein the content of the diacetylene tetraol compound is 0.05 to 0.8 wt %.

3. The ink composition according to 1 or 2 above, wherein the content of the glycol ether is 1.5 to 8.0 wt %.

4. An ink set for use in inkjet recording, having at least an ink composition according to any of 1 through 3 above as a structural component.

5. An ink cartridge filled with an ink composition according to any one of 1 through 3 above.

6. An inkjet recording method for recording by discharging droplets of an ink composition and affixing the droplets to a recording medium, wherein recording is accomplished using an ink composition according to any of 1 through 3 above or an ink set according to 4 or 5 above.

7. A recorded material printed by the inkjet recording method according to 6 above.

The present invention can provide an ink composition that allows normal discharge with fewer adverse effects from bubbles in the ink channel, an inkjet recording method using an ink composition having these properties, and a beautiful recorded material obtained by this recording method.

DESCRIPTION OF EXEMPLARY EMBODIMENTS

An ink composition of an aspect of the invention is explained below based on exemplary embodiments thereof.

An ink composition of an aspect of the invention comprises at least the diacetylene tetraol compound represented by general formula (1) below and the glycol ether represented by general formula (2) below as essential components:

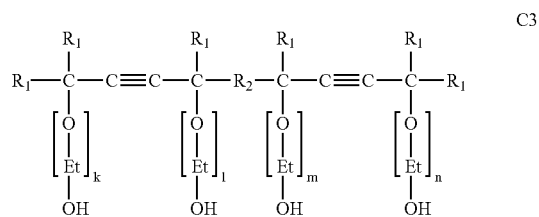

(wherein $R_1$ and $R_2$ each independently represent $C_{1-3}$ alkyl groups, —O-Et- represents oxyethylene and k, l, m and n are each integers from 0 to 2);

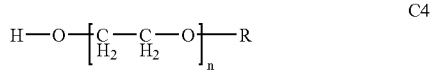

(wherein R represents a $C_8$ alkyl group, and n is an integer from 4 to 8).

By means of these features, an aspect of the present invention can reduce the ill effects of bubbles in the ink channel to thereby allow normal discharge and provide a beautiful recorded material.

An ink composition of an aspect of the invention normally contains, as essential components, at least a coloring agent together with the diacetylene tetraol compound represented by general formula (1) above and the glycol ether represented by general formula (2) above in water or an aqueous medium (solvent) consisting of water and a water-soluble organic solvent, and also contains as necessary humectants, surfactants, pH adjusters and other additives (described below).

One compound or a mixture of two or more compounds may be used for the diacetylene tetraol compound represented by general formula (1) above that is used in an aspect of the invention. The content thereof is preferably 0.05 to 0.8 wt %. This range provides not only adequate bubble-elimination effects (adhesion suppressing effects), but also excellent flying stability.

One compound or a mixture of two or more compounds may be used for the glycol ether represented by general formula (2) above that is used in an aspect of the invention. The content thereof is preferably 1.5 to 8.0 wt %. This provides not only solution stability but also excellent flying stability.

An ink and in particular a dye or pigment used in inkjet recording can be used as the coloring agent in an ink composition of an aspect of the invention.

A direct dye, acidic dye, food dye, basic dye, dispersed dye, vat dye, soluble vat dye, reactive dye or the like can be used as the dye. An organic pigment or inorganic pigment can be used as the pigment.

One such coloring agent or a mixture of two or more can be used in an ink composition of an aspect of the invention. The content of the coloring agent is preferably 0.5 to 12 wt % or more preferably 1.0 to 10 wt % of the total volume of the ink composition.

An ink composition of an aspect of the invention preferably uses water or a mixture of water and a water-soluble solvent as the principal solvent.

Ion-exchange water, ultrafiltered water, reverse-osmosis water, distilled water or the like can be used as the water. For purposes of long-term storage, it is desirable to use water that has been sterilized by ultraviolet exposure or a form of chemical sterilization such as addition of hydrogen peroxide.

When water is used as the principal solvent, the water content of an ink composition of an aspect of the invention is preferably 40 to 90 wt % of the total weight of the ink composition, or more preferably 50 to 80 wt %.

An ink composition of an aspect of the invention may also contain a humectant selected from the sugars and/or the water-soluble organic solvents with vapor pressures lower than that of pure water. By including a humectant, it is possible to control moisture evaporation and maintain the moisture content of the ink in an inkjet recording system. By using a water-soluble organic solvent, it is possible to improve discharge stability and easily adjust the viscosity without altering the ink properties.

A water-soluble organic solvent is a solvent having the ability to dissolve a solute, and is selected from the water-soluble solvents that are organic and have vapor pressures lower than that of water. Specific examples include propylene glycol, butanediol, pentanediol, 2-buten-1,4-diol, 2-methyl-2,4-pentanediol, 1,2,6-hexanetriol, diethylene glycol, triethylene glycol, dipropylene glycol and other polyvalent alcohols, methyl alcohol, ethyl alcohol, n-propylene alcohol, n-butyl alcohol and other alkyl alcohols, acetonyl acetone and other ketones, γ-butyrolactone, triethyl phosphate and other esters, and furfuryl alcohol, tetrahydrofurfuryl alcohol, thiodiglycol, glycerin and the like.

Examples of sugars include maltitol, sorbitol, gluconolactone, maltose and the like.

These humectants should be added in the amount of 5 to 50 wt % or preferably 5 to 30 wt % or more preferably 5 to 20 wt % based on the total weight of the ink composition. Humectant properties are obtained with 5 wt % or more, while 50 wt % or less allows the viscosity to be easily adjusted for use in inkjet recording.

Moreover, a nonionic surfactant other than the diacetylene tetraol compound represented by general formula (1) above and a glycol ether other than that represented by general formula (2) above may also be included in the ink composition of an aspect of the invention as effective additives for obtaining rapid fixation (penetration) of the ink and maintaining the roundness of the individual dots.

pH adjusters, solubilizers, antioxidants, sodium alginate and other water-soluble polymers, water-soluble resins, fluorine surfactants, preservatives, mold-proofing agents, rust-proofing agents and the like can also be added to an ink composition of an aspect of the invention as necessary. Examples of pH adjusters, solubilizers and antioxidants include diethanolamine, triethanolamine, propanolamine, morpholine and other amines and denatured amines, potassium hydroxide, sodium hydroxide, lithium hydroxide and other metal hydroxides, ammonium hydroxide, tertiary ammonium hydroxide (tetramethyl ammonium, etc.) and other ammonium salts, potassium carbonate, sodium carbonate, lithium carbonate and other carbonates and phosphates and the like, or N-methyl-2-pyrrolidone, 2-pyrrolidone and other pyrrolidones, urea, thiourea, tetramethylurea and other ureas, allophanate, methyl allophanate and other allophanates, biuret, dimethyl biuret, tetramethyl biuret and other biurets and the like, as well as L-ascorbic acid and salts thereof.

Examples of preservatives and mold-proofing agents include sodium benzoate, sodium pentachlorophenol, sodium 2-pyridinethiol-1-oxide, sodium sorbate, sodium dehydroacetate and 1,2-dibenzisothiazoline-3-one (AVECIA Co. trade names Proxel CRL, Proxel BDN, Proxel GXL, Proxel XL-2 and Proxel TN) and the like.

These components may be used individually, or a mixture of multiple components selected from each group or from different groups may be used.

In an ink composition of an aspect of the invention, the amounts of all the components of the ink composition are preferably selected so that the viscosity of the ink composition is less than 10 mPa·s at 20° C.

The surface tension of an ink composition of an aspect of the invention is preferably 45 mN/m or less at 20° C., or more preferably in the range of 25 to 45 mN/m.

The pH of an ink composition of an aspect of the invention at 20° C. is preferably adjusted to within the range of 8.0 to 10.5.

An ink composition of an aspect of the invention may be prepared for example by thoroughly mixing and dissolving each component, filtering them under pressure with an 0.8 μm pore size membrane filter, and then degassing with a vacuum pump.

An ink composition of an aspect of the invention can be used favorably in pens and other ordinary writing instruments, recorders, pen plotters, stamps and the like, but is especially desirable as an ink composition for inkjet recording.

An aspect of the present invention also provides an ink set obtained by combining the ink composition described above with one or more other ink compositions of different colors. One such ink set consists of one or more ink cartridges containing each ink composition either together or separately. An ink set of this aspect of the invention can of course be used for such applications as ordinary writing instruments, recorders, pen plotters and the like.

An ink set of this embodiment may also be an ink set having at least two different ink compositions with different color concentrations. For example, it may be an ink set having at least two cyan ink compositions with different color concentrations, or in other words an ink set having at least a dark cyan ink composition and a light cyan ink composition.

Similarly, it may be an ink set having at least two magenta ink compositions with different color concentrations, or in other words an ink set having at least a dark magenta ink composition and a light magenta ink composition.

It may also be an ink set having two ink compositions of any other color, in dark and light concentrations.

An aspect of the invention also provides an inkjet recording method for printing and recording whereby the specialty cartridge or cartridges of an inkjet printer are filled with the ink compositions of an ink set having ink compositions of an aspect of the invention as described above, droplets are discharged from the fine holes (nozzles) of the respective nozzle heads, and the droplets are affixed to a recording medium.

Any previously known system can be used as the inkjet recording system, and in particular excellent image recording can be accomplished using a method in which droplets are discharged using the oscillation of a piezoelectric element (recording method using an inkjet head that forms ink droplets by means of the mechanical deformation of an electrostrictive element), or a method using thermal energy.

With this inkjet recording method, a recorded material of an aspect of the invention can be obtained by discharging droplets consisting of ink compositions of each color from an ink set of an aspect of the invention onto a paper or other recording medium to thereby form words or images.

A recorded material of an aspect of the invention is recorded by the inkjet recording method described above using an ink composition of the configuration described above, and a recorded material with good printing quality can be obtained by using an ink composition of an aspect of the invention.

EXAMPLES

Embodiments of the present invention are explained in more detail below by means of examples and comparative examples, but the present invention is in no way restricted by these examples.

Ink Preparation

Preparation of Ink Compositions

The ink compositions shown in Tables 1 through 15 were prepared in the same way as a conventional ink composition except that the diacetylene tetraol compound represented by general formula (1) above and the glycol ether represented by general formula (2) above were used as essential components of the ink. Specifically, the constituent materials were thoroughly mixed and dissolved in the solvent, and filtered under pressure using a membrane filter with a pore diameter of about 0.8 μm.

Each of the resulting ink compositions was evaluated for bubble elimination [8], solution stability [9] and flying stability [10]. The evaluation methods are described below. The results are shown in Tables 1 through 15.

TABLE 1

| Materials | \multicolumn{24}{c}{Comparative Examples} |
|---|---|
|  | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
| Diacetylene tetraol compound [000] | 0.1 | 0.1 |  |  |  |  |  |  |  |  |  |  |  |  |  |  |  |  |  |  |  |  |  |  |
| Diacetylene tetraol compound [001] |  |  | 0.1 | 0.1 |  |  |  |  |  |  |  |  |  |  |  |  |  |  |  |  |  |  |  |  |
| Diacetylene tetraol compound [002] |  |  |  |  | 0.1 | 0.1 |  |  |  |  |  |  |  |  |  |  |  |  |  |  |  |  |  |  |
| Diacetylene tetraol compound [003] |  |  |  |  |  |  | 0.1 | 0.1 |  |  |  |  |  |  |  |  |  |  |  |  |  |  |  |  |
| Diacetylene tetraol compound [010] |  |  |  |  |  |  |  |  | 0.1 | 0.1 |  |  |  |  |  |  |  |  |  |  |  |  |  |  |
| Diacetylene tetraol compound [011] |  |  |  |  |  |  |  |  |  |  | 0.1 | 0.1 |  |  |  |  |  |  |  |  |  |  |  |  |
| Diacetylene tetraol compound [012] |  |  |  |  |  |  |  |  |  |  |  |  | 0.1 | 0.1 |  |  |  |  |  |  |  |  |  |  |
| Diacetylene tetraol compound [013] |  |  |  |  |  |  |  |  |  |  |  |  |  |  | 0.1 |  |  |  |  |  |  |  |  |  |
| Diacetylene tetraol compound [020] |  |  |  |  |  |  |  |  |  |  |  |  |  |  |  | 0.1 |  |  |  |  |  |  |  |  |
| Diacetylene tetraol compound [021] |  |  |  |  |  |  |  |  |  |  |  |  |  |  |  |  | 0.1 |  |  |  |  |  |  |  |
| Diacetylene tetraol compound [022] |  |  |  |  |  |  |  |  |  |  |  |  |  |  |  |  |  | 0.1 |  |  |  |  |  |  |
| Diacetylene tetraol compound [023] |  |  |  |  |  |  |  |  |  |  |  |  |  |  |  |  |  |  | 0.1 |  |  |  |  |  |
| Diacetylene tetraol compound [030] |  |  |  |  |  |  |  |  |  |  |  |  |  |  |  |  |  |  |  | 0.1 |  |  |  |  |
| Diacetylene tetraol compound [031] |  |  |  |  |  |  |  |  |  |  |  |  |  |  |  |  |  |  |  |  | 0.1 |  |  |  |
| Diacetylene tetraol compound [032] |  |  |  |  |  |  |  |  |  |  |  |  |  |  |  |  |  |  |  |  |  | 0.1 |  |  |
| Diacetylene tetraol compound [033] |  |  |  |  |  |  |  |  |  |  |  |  |  |  |  |  |  |  |  |  |  |  | 0.1 |  |
| Diacetylene tetraol compound [040] |  |  |  |  |  |  |  |  |  |  |  |  |  |  |  |  |  |  |  |  |  |  |  | 0.1 |
| Diacetylene tetraol compound [041] |  |  |  |  |  |  |  |  |  |  |  |  |  |  |  |  |  |  |  |  |  |  |  |  |
| Diacetylene tetraol compound [042] |  |  |  |  |  |  |  |  |  |  |  |  |  |  |  |  |  |  |  |  |  |  |  |  |
| Diacetylene tetraol compound [043] |  |  |  |  |  |  |  |  |  |  |  |  |  |  |  |  |  |  |  |  |  |  |  |  |
| EH2G [2G] | 3.0 |  |  |  |  |  |  |  |  |  |  |  |  |  | 3.0 |  |  |  |  |  |  | 3.0 |  |  |
| EH3G [3G] |  | 3.0 |  |  |  |  |  |  |  |  |  |  |  |  |  | 3.0 |  |  |  |  |  |  | 3.0 |  |
| EH4G [4G] |  |  | 3.0 |  |  |  |  |  |  |  |  |  |  |  |  |  | 3.0 |  |  |  |  |  |  | 3.0 |
| EH6G [6G] |  |  |  | 3.0 |  |  |  |  |  |  |  |  |  |  |  |  |  | 3.0 |  |  |  |  |  |  |
| EH8G [8G] |  |  |  |  | 3.0 |  |  |  |  |  |  |  |  |  |  |  |  |  | 3.0 |  |  |  |  |  |
| EH9G [9G] |  |  |  |  |  | 3.0 |  |  |  |  |  |  |  |  |  |  |  |  |  | 3.0 |  |  |  |  |
| EH10G [10G] |  |  |  |  |  |  | 3.0 |  |  |  |  |  |  |  |  |  |  |  |  |  | 3.0 |  |  |  |
| Triethylene glycol mono butyl ether | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 |
| Glycerin | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 |
| Triethylene glycol | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 |
| Triethanolamine | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| Dye A | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| Ultrafiltered water | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 |
| Total | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 |
| Bubble elimination [8] | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| Solution stability [9] | 5 | 5 | 5 | 5 | 5 | 5 | 5 | 5 | 5 | 5 | 5 | 5 | 5 | 5 | 5 | 5 | 5 | 5 | 5 | 5 | 5 | 4 | 4 | 4 |

TABLE 2

| Materials | Comparative Examples | | | | | | | | | | | | | | | | | | | | | | | |
|---|---|---|---|---|---|---|---|---|---|---|---|---|---|---|---|---|---|---|---|---|---|---|---|---|
| | 25 | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 |
| Diacetylene tetraol compound [100] | 0.1 | | | | | | | | | | | | | | | | | | | | | | | |
| Diacetylene tetraol compound [101] | | 0.1 | | | | | | | | | | | | | | | | | | | | | | |
| Diacetylene tetraol compound [102] | | | 0.1 | | | | | | | | | | | | | | | | | | | | | |
| Diacetylene tetraol compound [103] | | | | 0.1 | | | | | | | | | | | | | | | | | | | | |
| Diacetylene tetraol compound [110] | | | | | 0.1 | | | | | | | | | | | | | | 0.1 | 0.1 | 0.1 | 0.1 | 0.1 | 0.1 |
| Diacetylene tetraol compound [111] | | | | | | 0.1 | | | | | | | | | | | | | | | | | | |
| Diacetylene tetraol compound [112] | | | | | | | 0.1 | | | | | | | | | | | | | | | | | |
| Diacetylene tetraol compound [113] | | | | | | | | 0.1 | | | | | | | | | | | | | | | | |
| Diacetylene tetraol compound [120] | | | | | | | | | 0.1 | | | | | | | | | | | | | | | |
| Diacetylene tetraol compound [121] | | | | | | | | | | 0.1 | | | | | | | | | | | | | | |
| Diacetylene tetraol compound [122] | | | | | | | | | | | 0.1 | | | | | | | | | | | | | |
| Diacetylene tetraol compound [123] | | | | | | | | | | | | 0.1 | | | | | | | | | | | | |
| Diacetylene tetraol compound [130] | | | | | | | | | | | | | 0.1 | | | | | | | | | | | |
| Diacetylene tetraol compound [131] | | | | | | | | | | | | | | 0.1 | | | | | | | | | | |
| Diacetylene tetraol compound [132] | | | | | | | | | | | | | | | 0.1 | | | | | | | | | |
| Diacetylene tetraol compound [133] | | | | | | | | | | | | | | | | 0.1 | | | | | | | | |
| [140] | | | | | | | | | | | | | | | | | 0.1 | | | | | | | |
| [141] | | | | | | | | | | | | | | | | | | 0.1 | | | | | | |
| [142] | | | | | | | | | | | | | | | | | | | | | | | | |
| [143] | | | | | | | | | | | | | | | | | | | | | | | | |
| EH2G [2G] | 3.0 | | | | | | | | | | | | | | | | | | | | | | | |
| EH3G [3G] | | 3.0 | | | | | | | | | | | | | | | | | | | | | | |
| EH4G [4G] | | | 3.0 | | | | | | | | | | | | | | | | | | | | | |
| EH6G [6G] | | | | 3.0 | 3.0 | 3.0 | 3.0 | 3.0 | 3.0 | 3.0 | 3.0 | 3.0 | | | | | | | 3.0 | 3.0 | | | | |
| EH8G [8G] | | | | | | | | | | | | | 3.0 | 3.0 | 3.0 | 3.0 | 3.0 | 3.0 | | | 3.0 | | | |
| EH9G [9G] | | | | | | | | | | | | | | | | | | | | | | 3.0 | 3.0 | |
| EH10G [10G] | | | | | | | | | | | | | | | | | | | | | | | | 3.0 |
| Triethylene glycol mono butyl ether | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 |
| Glycerin | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 |
| Triethylene glycol | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 |
| Triethanolamine | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| Dye A | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| Ultrafiltered water | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 |
| Total | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 |
| Bubble elimination [8] | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| Solution stability [9] | 4 | 5 | 5 | 5 | 5 | 5 | 5 | 5 | 5 | 5 | 5 | 5 | 5 | 5 | 5 | 5 | 5 | 5 | 4 | 4 | 3 | 3 | 4 | 4 |

TABLE 3

| Materials | Comparative Examples | | | | | | | | | | | | | | | | | | | | | | | |
|---|---|---|---|---|---|---|---|---|---|---|---|---|---|---|---|---|---|---|---|---|---|---|---|---|
| | 49 | 50 | 51 | 52 | 53 | 54 | 55 | 56 | 57 | 58 | 59 | 60 | 61 | 62 | 63 | 64 | 65 | 66 | 67 | 68 | 69 | 70 | 71 | 72 |
| Diacetylene tetraol compound [100] | 0.1 | 0.1 | | | | | | | | | | | | | | | | | | | | | | |
| Diacetylene tetraol compound [101] | | | 0.1 | 0.1 | | | | | | | | | | | | | | | | | | | | |
| Diacetylene tetraol compound [102] | | | | | 0.1 | 0.1 | | | | | | | | | | | | | | | | | | |
| Diacetylene tetraol compound [103] | | | | | | | 0.1 | 0.1 | | | | | | | | | | | | | | | | |
| Diacetylene tetraol compound [110] | | | | | | | | | 0.1 | 0.1 | | | | | | | | | | | | | | |
| Diacetylene tetraol compound [111] | | | | | | | | | | | 0.1 | 0.1 | | | | | | | | | | | | |
| Diacetylene tetraol compound [112] | | | | | | | | | | | | | 0.1 | 0.1 | | | | | | | | | | |
| Diacetylene tetraol compound [113] | | | | | | | | | | | | | | | 0.1 | 0.1 | | | | | | | | |
| Diacetylene tetraol compound [120] | | | | | | | | | | | | | | | | | 0.1 | 0.1 | | | | | | |
| Diacetylene tetraol compound [121] | | | | | | | | | | | | | | | | | | | 0.1 | 0.1 | | | | |
| Diacetylene tetraol compound [122] | | | | | | | | | | | | | | | | | | | | | 0.1 | 0.1 | | |
| Diacetylene tetraol compound [123] | | | | | | | | | | | | | | | | | | | | | | | 0.1 | 0.1 |
| Diacetylene tetraol compound [130] | | | | | | | | | | | | | | | | | | | | | | | | |
| Diacetylene tetraol compound [131] | | | | | | | | | | | | | | | | | | | | | | | | |
| Diacetylene tetraol compound [132] | | | | | | | | | | | | | | | | | | | | | | | | |
| Diacetylene tetraol compound [133] | | | | | | | | | | | | | | | | | | | | | | | | |
| Diacetylene tetraol compound [140] | | | | | | | | | | | | | | | | | | | | | | | | |
| Diacetylene tetraol compound [141] | | | | | | | | | | | | | | | | | | | | | | | | |
| Diacetylene tetraol compound [142] | | | | | | | | | | | | | | | | | | | | | | | | |
| Diacetylene tetraol compound [143] | | | | | | | | | | | | | | | | | | | | | | | | |
| EH2G [2G] | 3.0 | | | | | | | | | | | | | | | | | | | | | | | |
| EH3G [3G] | | 3.0 | | | | | | | | | | | | | | | | | | | | | | |
| EH4G [4G] | | | 3.0 | | | | | | | | | | | | | | | | | | | | | |
| EH6G [6G] | | | | 3.0 | | | | | | | | | | | | | | | | | | | | |
| EH8G [8G] | | | | | 3.0 | | | | | | | | | | | | | | | | | | | |
| EH9G [9G] | | | | | | 3.0 | | | | | | | | | | | | | | | | | | |
| EH10G [10G] | | | | | | | 3.0 | | | | | | | | | | | | | | | | | |
| Triethylene glycol mono butyl ether | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 |
| Glycerin | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 |
| Triethylene glycol | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 |
| Triethanolamine | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| Dye A | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| Ultrafiltered water | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 |
| Total | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 |
| Bubble elimination [8] | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| Solution stability [9] | 3 | 3 | 5 | 5 | 5 | 4 | 5 | 5 | 5 | 5 | 5 | 5 | 5 | 4 | 4 | 3 | 3 | 4 | 4 | 4 | 4 | 5 | 5 | 4 |

TABLE 4

| Materials | Comparative Examples | | | | | | | | | | | | | Examples | | | | | | | | | | |
|---|---|---|---|---|---|---|---|---|---|---|---|---|---|---|---|---|---|---|---|---|---|---|---|---|
| | 73 | 74 | 75 | 76 | 77 | 78 | 79 | 80 | 81 | 82 | 83 | 84 | 85 | 1 | 2 | 3 | 4 | 5 | 6 | 7 | 8 | 9 | 10 | 11 |
| Diacetylene tetraol compound [100] | | | | | | | | | | | | | | | | | | | | | | | | |
| Diacetylene tetraol compound [101] | | | | | | | | | | | | | | | | | | | | | | | | |
| Diacetylene tetraol compound [102] | | 0.1 | | | | | | | | | | | | | | | | | | | | | | |
| Diacetylene tetraol compound [103] | | | 0.1 | | | | | | | | | | | | | | | | | | | | | |
| Diacetylene tetraol compound [110] | | | | 0.1 | 0.1 | | | | | | | | | 0.1 | | | | | | | | | | |
| Diacetylene tetraol compound [111] | | | | | 0.1 | 0.1 | | | | | | | | | 0.1 | | | | | | | | | |
| Diacetylene tetraol compound [112] | | | | | | 0.1 | | | | | | | | | | 0.1 | | | | | | | | |
| Diacetylene tetraol compound [113] | | | | | | | | | | | | | | | | | 0.1 | | | | | | | |
| Diacetylene tetraol compound [120] | | | | | | | 0.1 | 0.1 | | | | | | | | | | 0.1 | | | | | | |
| Diacetylene tetraol compound [121] | | | | | | | | 0.1 | | | | | | | | | | | 0.1 | | | | | |
| Diacetylene tetraol compound [122] | 0.1 | | | | | | | | 0.1 | | | | | | | | | | | 0.1 | | | | |
| Diacetylene tetraol compound [123] | | | | | | | | | 0.1 | | | | | | | | | | | | 0.1 | | | |
| Diacetylene tetraol compound [130] | | | | | | | | | | 0.1 | | | | | | | | | | | | 0.1 | | |
| Diacetylene tetraol compound [131] | | | | | | | | | | | 0.1 | | | | | | | | | | | | 0.1 | |
| Diacetylene tetraol compound [132] | | | | | | | | | | | | 0.1 | | | | | | | | | | | | 0.1 |
| Diacetylene tetraol compound [133] | | | | | | | | | | | | 0.1 | | | | | | | | | | | | |
| Diacetylene tetraol compound [140] | | | | | | | | | | | | | 0.1 | | | | | | | | | | | |
| Diacetylene tetraol compound [141] | | | | | | | | | | | | | | | | | | | | | | | | |
| Diacetylene tetraol compound [142] | | | | | | | | | | | | | 0.1 | | | | | | | | | | | |
| Diacetylene tetraol compound [143] | | | | | | | | | | | | | | | | | | | | | | | | |
| EH2G [2G] | 3.0 | | | | | | | | | | | | | 3.0 | | | | | | | | | | |
| EH3G [3G] | | 3.0 | | | | | | | | | | | | | 3.0 | | | | | | | | | |
| EH4G [4G] | | | 3.0 | | | | | | | | | | | | | 3.0 | | | | | | | | |
| EH6G [6G] | | | | 3.0 | | | | | | | | | | | | | 3.0 | | | | | | | |
| EH8G [8G] | | | | | 3.0 | | | | | | | | | | | | | 3.0 | | | | | | |
| EH9G [9G] | | | | | | 3.0 | | | | | | | | | | | | | 3.0 | | | | | |
| EH10G [10G] | | | | | | | 3.0 | 3.0 | 3.0 | 3.0 | 3.0 | 3.0 | 3.0 | | | | | | | 3.0 | 3.0 | 3.0 | 3.0 | 3.0 |
| Triethylene glycol mono butyl ether | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 |
| Glycerin | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 |
| Triethylene glycol | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 |
| Triethanolamine | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| Dye A | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| Ultrafiltered water | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 |
| Total | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 |
| Bubble elimination [8] | 1 | 1 | 1 | 1 | 1 | 1 | 1 | 1 | 1 | 1 | 1 | 1 | 1 | 4 | 4 | 4 | 2 | 2 | 2 | 2 | 2 | 2 | 2 | 2 |
| Solution stability [9] | 4 | 4 | 4 | 3 | 3 | 4 | 4 | 4 | 4 | 5 | 5 | 4 | 4 | 4 | 4 | 4 | 4 | 4 | 4 | 4 | 3 | 3 | 4 | 4 |

TABLE 5

| Materials | Examples |  |  |  |  |  |  |  |  |  |  |  |  |  |  |  |
|---|---|---|---|---|---|---|---|---|---|---|---|---|---|---|---|---|
|  | 12 | 13 | 14 | 15 | 16 | 17 | 18 | 19 | 20 | 21 | 22 | 23 | 24 | 25 | 26 | 27 |
| Diacetylene tetraol compound [100] |  |  |  |  |  |  |  |  |  |  |  |  |  |  |  |  |
| Diacetylene tetraol compound [101] |  |  |  |  |  |  |  |  |  |  |  |  |  |  |  |  |
| Diacetylene tetraol compound [102] |  |  |  |  |  |  |  |  |  |  |  |  |  |  |  |  |
| Diacetylene tetraol compound [103] |  |  |  |  |  |  |  |  |  |  |  |  |  |  |  |  |
| Diacetylene tetraol compound [110] |  |  |  |  |  |  |  |  |  |  |  |  |  |  |  |  |
| Diacetylene tetraol compound [111] |  |  |  |  |  |  |  |  |  |  |  |  |  |  |  |  |
| Diacetylene tetraol compound [112] |  |  |  |  |  |  |  | 0.1 | 0.1 | 0.1 |  |  |  |  |  |  |
| Diacetylene tetraol compound [113] |  |  |  |  |  |  |  |  |  |  |  |  |  |  |  |  |
| Diacetylene tetraol compound [120] |  |  |  |  |  |  |  |  |  |  |  |  |  |  |  |  |
| Diacetylene tetraol compound [121] | 0.1 |  |  |  |  |  |  |  |  |  |  |  |  |  |  |  |
| Diacetylene tetraol compound [122] |  |  |  |  |  |  |  |  |  |  | 0.1 | 0.1 | 0.1 |  |  |  |
| Diacetylene tetraol compound [123] |  |  |  |  |  |  |  |  |  |  |  |  |  |  |  |  |
| Diacetylene tetraol compound [130] |  | 0.1 | 0.1 | 0.1 |  |  |  |  |  |  |  |  |  |  |  |  |
| Diacetylene tetraol compound [131] |  |  |  |  | 0.1 | 0.1 | 0.1 |  |  |  |  |  |  |  |  |  |
| Diacetylene tetraol compound [132] |  |  |  |  |  |  |  |  |  |  |  |  |  | 0.1 | 0.1 | 0.1 |
| Diacetylene tetraol compound [133] |  |  |  |  |  |  |  |  |  |  |  |  |  |  |  |  |
| Diacetylene tetraol compound [140] |  |  |  |  |  |  |  |  |  |  |  |  |  |  |  |  |
| Diacetylene tetraol compound [141] |  |  |  |  |  |  |  |  |  |  |  |  |  |  |  |  |
| Diacetylene tetraol compound [142] |  |  |  |  |  |  |  |  |  |  |  |  |  |  |  |  |
| Diacetylene tetraol compound [143] |  |  |  |  |  |  |  |  |  |  |  |  |  |  |  |  |
| EH2G [2G] |  |  |  |  |  |  |  |  |  |  |  |  |  |  |  |  |
| EH3G [3G] |  |  |  |  |  |  |  |  |  |  |  |  |  |  |  |  |
| EH4G [4G] |  | 3.0 |  |  | 3.0 |  |  | 3.0 |  |  | 3.0 |  |  | 3.0 |  |  |
| EH6G [6G] |  |  | 3.0 |  |  | 3.0 |  |  | 3.0 |  |  | 3.0 |  |  | 3.0 |  |
| EH8G [8G] | 3.0 |  |  | 3.0 |  |  | 3.0 |  |  | 3.0 |  |  | 3.0 |  |  | 3.0 |
| EH9G [9G] |  |  |  |  |  |  |  |  |  |  |  |  |  |  |  |  |
| EH10G [10G] |  |  |  |  |  |  |  |  |  |  |  |  |  |  |  |  |
| Triethylene glycol mono butyl ether | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 |
| Glycerin | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 |
| Triethylene glycol | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 |
| Triethanolamine | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| Dye A | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| Ultrafiltered water | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 |
| Total | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 |
| Bubble elimination [8] | 2 | 2 | 2 | 2 | 2 | 2 | 2 | 2 | 2 | 2 | 2 | 2 | 2 | 2 | 2 | 2 |
| Solution stability [9] | 4 | 4 | 3 | 3 | 4 | 4 | 4 | 5 | 5 | 5 | 5 | 5 | 5 | 5 | 5 | 5 |

TABLE 6

| Materials | Comparative Examples | | | | | | | | | | | | | | | | | | | | | | | |
|---|---|---|---|---|---|---|---|---|---|---|---|---|---|---|---|---|---|---|---|---|---|---|---|---|
| | 86 | 87 | 88 | 89 | 90 | 91 | 92 | 93 | 94 | 95 | 96 | 97 | 98 | 99 | 100 | 101 | 102 | 103 | 104 | 105 | 106 | 107 | 108 | 109 |
| Diacetylene tetraol compound [200] | 0.1 | | | | | | | | | | | | | | | | | | | | | | | |
| Diacetylene tetraol compound [201] | | 0.1 | | | | | | | | | | | | | | | | | | | | | | |
| Diacetylene tetraol compound [202] | | | 0.1 | | | | | | | | | | | | | | | | | | | | | |
| Diacetylene tetraol compound [203] | | | | 0.1 | | | | | | | | | | | | | | | | | | | | |
| Diacetylene tetraol compound [210] | | | | | 0.1 | | | | | | | | | | | | | | | | | | | |
| Diacetylene tetraol compound [211] | | | | | | 0.1 | | | | | | | | | | | | | | | | | | |
| Diacetylene tetraol compound [212] | | | | | | | 0.1 | | | | | | | | | | | | | | | | | |
| Diacetylene tetraol compound [213] | | | | | | | | 0.1 | | | | | | | | | | | | | | | | |
| Diacetylene tetraol compound [220] | | | | | | | | | 0.1 | | | | | | | | | | | | | | | |
| Diacetylene tetraol compound [221] | | | | | | | | | | 0.1 | | | | | | | | | | | | | | |
| Diacetylene tetraol compound [222] | | | | | | | | | | | 0.1 | | | | | | | | | | | | | |
| Diacetylene tetraol compound [223] | | | | | | | | | | | | 0.1 | | | | | | | | | | | | |
| Diacetylene tetraol compound [230] | | | | | | | | | | | | | 0.1 | | | | | | | | | | | |
| Diacetylene tetraol compound [231] | | | | | | | | | | | | | | 0.1 | | | | | | | | | | |
| Diacetylene tetraol compound [232] | | | | | | | | | | | | | | | 0.1 | | | | | | | | | |
| Diacetylene tetraol compound [233] | | | | | | | | | | | | | | | | 0.1 | | | | | | | | |
| Diacetylene tetraol compound [240] | | | | | | | | | | | | | | | | | 0.1 | | | | | | | |
| Diacetylene tetraol compound [241] | | | | | | | | | | | | | | | | | | 0.1 | | | | | | |
| Diacetylene tetraol compound [242] | | | | | | | | | | | | | | | | | | | 0.1 | | | | | |
| Diacetylene tetraol compound [243] | | | | | | | | | | | | | | | | | | | | 0.1 | | | | |
| EH2G [2G] | 3.0 | | | | | | | | | | | | | | | | | | | | | | | |
| EH3G [3G] | | 3.0 | | | | | | | | | | | | | | | | | | | | | | |
| EH4G [4G] | | | 3.0 | | | | | | | | | | | | | | | | | | | | | |
| EH6G [6G] | | | | 3.0 | | | | | | | | | | | | | | | | | | | | |
| EH8G [8G] | | | | | 3.0 | 3.0 | 3.0 | 3.0 | 3.0 | | | | | | | | | | | | | | | |
| EH9G [9G] | | | | | | | | | | 3.0 | 3.0 | 3.0 | 3.0 | 3.0 | | | | | | | | | | |
| EH10G [10G] | | | | | | | | | | | | | | | 3.0 | 3.0 | 3.0 | 3.0 | 3.0 | 3.0 | 3.0 | 3.0 | 3.0 | 3.0 |
| Triethylene glycol mono butyl ether | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 |
| Glycerin | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 |
| Triethylene glycol | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 |
| Triethanolamine | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| Dye A | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| Ultrafiltered water | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 |
| Total | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 |
| Bubble elimination [8] | 1 | 1 | 1 | 1 | 1 | 1 | 1 | 1 | 1 | 2 | 1 | 1 | 1 | 1 | 1 | 1 | 1 | 1 | 1 | 1 | 1 | 1 | 1 | 1 |
| Solution stability [9] | 3 | 3 | 3 | 3 | 3 | 3 | 3 | 3 | 3 | 3 | 3 | 3 | 3 | 3 | 4 | 3 | 3 | 3 | 4 | 4 | 3 | 3 | 3 | 3 |

TABLE 7

| Materials | \multicolumn{24}{c}{Comparative Examples} |
|---|---|---|---|---|---|---|---|---|---|---|---|---|---|---|---|---|---|---|---|---|---|---|---|---|
| | 110 | 111 | 112 | 113 | 114 | 115 | 116 | 117 | 118 | 119 | 120 | 121 | 122 | 123 | 124 | 125 | 126 | 127 | 128 | 129 | 130 | 131 | 132 | 133 |
| Diacetylene tetraol compound [200] | 0.1 | | | | | | | | | | | | | | | | | | | | | | | |
| Diacetylene tetraol compound [201] | | 0.1 | | | | | | | | | | | | | | | | | | | | | | |
| Diacetylene tetraol compound [202] | | | 0.1 | | | | | | | | | | | | | | | | | | | | | |
| Diacetylene tetraol compound [203] | | | | 0.1 | | | | | | | | | | | | | | | | | | | | |
| Diacetylene tetraol compound [210] | | | | | 0.1 | | | | | | | | | | | | | | | | | | | |
| Diacetylene tetraol compound [211] | | | | | | 0.1 | | | | | | | | | | | | | | | | | | |
| Diacetylene tetraol compound [212] | | | | | | | 0.1 | | | | | | | | | | | | | | | | | |
| Diacetylene tetraol compound [213] | | | | | | | | 0.1 | | | | | | | | | | | | | | | | |
| Diacetylene tetraol compound [220] | | | | | | | | | 0.1 | | | | | | | | | | | | | | | |
| Diacetylene tetraol compound [221] | | | | | | | | | | 0.1 | | | | | | | | | | | | | | |
| Diacetylene tetraol compound [222] | | | | | | | | | | | 0.1 | | | | | | | | | | | | | |
| Diacetylene tetraol compound [223] | | | | | | | | | | | | 0.1 | | | | | | | | | | | | |
| Diacetylene tetraol compound [230] | | | | | | | | | | | | | 0.1 | | | | | | | | | | | |
| Diacetylene tetraol compound [231] | | | | | | | | | | | | | | 0.1 | | | | | | | | | | |
| Diacetylene tetraol compound [232] | | | | | | | | | | | | | | | 0.1 | | | | | | | | | |
| Diacetylene tetraol compound [233] | | | | | | | | | | | | | | | | 0.1 | | | | | | | | |
| Diacetylene tetraol compound [240] | | | | | | | | | | | | | | | | | 0.1 | | | | | | | |
| Diacetylene tetraol compound [241] | | | | | | | | | | | | | | | | | | 0.1 | | | | | | |
| Diacetylene tetraol compound [242] | | | | | | | | | | | | | | | | | | | 0.1 | | | | | |
| Diacetylene tetraol compound [243] | | | | | | | | | | | | | | | | | | | | 0.1 | 0.1 | 0.1 | 0.1 | 0.1 |
| EH2G [2G] | 3.0 | | | | | | | | | | | | | | | | | | | | | | | |
| EH3G [3G] | | 3.0 | | | | | | | | | | | | | | | | | | | | | | |
| EH4G [4G] | | | 3.0 | | | | | | | | | | | | | | | | | | | | | |
| EH6G [6G] | | | | 3.0 | | | | | | | | | | | | | | | | | | | | |
| EH8G [8G] | | | | | 3.0 | | | | | | | | | | | | | | | | | | | |
| EH9G [9G] | | | | | | 3.0 | | | | | | | | | | | | | | | | | | |
| EH10G [10G] | | | | | | | 3.0 | | | | | | | | | | | | | | | | | |
| Triethylene glycol mono butyl ether | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 |
| Glycerin | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 |
| Triethylene glycol | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 |
| Triethanolamine | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| Dye A | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| Ultrafiltered water | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 |
| Total | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 |
| Bubble elimination [8] | 1 | 1 | 1 | 1 | 1 | 1 | 1 | 1 | 1 | 1 | 1 | 1 | 1 | 1 | 1 | 1 | 1 | 1 | 1 | 2 | 2 | 2 | 1 | 2 |
| Solution stability [9] | 3 | 4 | 4 | 4 | 4 | 3 | 3 | 3 | 3 | 3 | 3 | 3 | 3 | 3 | 3 | 3 | 3 | 2 | 2 | 4 | 4 | 3 | 3 | 3 |

TABLE 8

| Materials | Examples 28 | 29 | 30 | 31 | 32 | 33 | 34 | 35 | 36 | 37 | 38 |
|---|---|---|---|---|---|---|---|---|---|---|---|
| Diacetylene tetraol compound [200] | | | | | | | | | | | |
| Diacetylene tetraol compound [201] | | | | | | | | | | | |
| Diacetylene tetraol compound [202] | | | | | | | | | | | |
| Diacetylene tetraol compound [203] | | | | | | | | | | | |
| Diacetylene tetraol compound [210] | | | | | | | | | | | 0.1 |
| Diacetylene tetraol compound [211] | | | | | | | | | | | |
| Diacetylene tetraol compound [212] | 0.1 | | | | | | | | | | |
| Diacetylene tetraol compound [213] | | | | | | | | | | | |
| Diacetylene tetraol compound [220] | | | | | | | | | | | |
| Diacetylene tetraol compound [221] | | 0.1 | 0.1 | 0.1 | | | | | | | |
| Diacetylene tetraol compound [222] | | | | | 0.1 | 0.1 | 0.1 | | | | |
| Diacetylene tetraol compound [223] | | | | | | | | | | | |
| Diacetylene tetraol compound [230] | | | | | | | | | | | |
| Diacetylene tetraol compound [231] | | | | | | | | | | | |
| Diacetylene tetraol compound [232] | | | | | | | | 0.1 | 0.1 | 0.1 | |
| Diacetylene tetraol compound [233] | | | | | | | | | | | |
| Diacetylene tetraol compound [240] | | | | | | | | | | | |
| Diacetylene tetraol compound [241] | | | | | | | | | | | |
| Diacetylene tetraol compound [242] | | | | | | | | | | | |
| Diacetylene tetraol compound [243] | | | | | | | | | | | |
| EH2G [2G] | | | | | | | | | | | |
| EH3G [3G] | | | | | | | | | | | |
| EH4G [4G] | | 3.0 | | | 3.0 | | | 3.0 | | | 3.0 |
| EH6G [6G] | | | 3.0 | | | 3.0 | | | 3.0 | | |
| EH8G [8G] | 3.0 | | | 3.0 | | | 3.0 | | | 3.0 | |
| EH9G [9G] | | | | | | | | | | | |
| EH10G [10G] | | | | | | | | | | | |
| Triethylene glycol mono butyl ether | 7.0 | 7.0 | 7.0 | 7.0 | 7.0 | 7.0 | 7.0 | 7.0 | 7.0 | 7.0 | 7.0 |
| Glycerin | 10.0 | 10.0 | 10.0 | 10.0 | 10.0 | 10.0 | 10.0 | 10.0 | 10.0 | 10.0 | 10.0 |
| Triethylene glycol | 10.0 | 10.0 | 10.0 | 10.0 | 10.0 | 10.0 | 10.0 | 10.0 | 10.0 | 10.0 | 10.0 |
| Triethanolamine | 0.5 | 0.5 | 0.5 | 0.5 | 0.5 | 0.5 | 0.5 | 0.5 | 0.5 | 0.5 | 0.5 |
| Dye A | 1.0 | 1.0 | 1.0 | 1.0 | 1.0 | 1.0 | 1.0 | 1.0 | 1.0 | 1.0 | 1.0 |
| Ultrafiltered water | 68.4 | 68.4 | 68.4 | 68.4 | 68.4 | 68.4 | 68.4 | 68.4 | 68.4 | 68.4 | 68.4 |
| Total | 100.0 | 100.0 | 100.0 | 100.0 | 100.0 | 100.0 | 100.0 | 100.0 | 100.0 | 100.0 | 100.0 |
| Bubble elimination [8] | 2 | 3 | 3 | 3 | 2 | 2 | 2 | 2 | 2 | 2 | 2 |
| Solution stability [9] | 3 | 4 | 4 | 4 | 3 | 4 | 4 | 3 | 3 | 2 | 4 |

| Materials | Examples 39 | 40 | 41 | 42 | 43 | 44 | 45 | 46 | 47 | 48 | 49 |
|---|---|---|---|---|---|---|---|---|---|---|---|
| Diacetylene tetraol compound [200] | | | | | | | | | | | |
| Diacetylene tetraol compound [201] | | | | | | | | | | | |
| Diacetylene tetraol compound [202] | | | | | | | | | | | |
| Diacetylene tetraol compound [203] | | | | | | | | | | | |
| Diacetylene tetraol compound [210] | 0.1 | 0.1 | | | | | | | | | |
| Diacetylene tetraol compound [211] | | | | | | | | | | | |
| Diacetylene tetraol compound [212] | | | | | | | | | | | |
| Diacetylene tetraol compound [213] | | | | | | | | | | | |
| Diacetylene tetraol compound [220] | | | 0.1 | 0.1 | 0.1 | | | | | | |
| Diacetylene tetraol compound [221] | | | | | | | | | | | |
| Diacetylene tetraol compound [222] | | | | | | | | | | | |
| Diacetylene tetraol compound [223] | | | | | | | | | | | |
| Diacetylene tetraol compound [230] | | | | | | 0.1 | 0.1 | 0.1 | | | |
| Diacetylene tetraol compound [231] | | | | | | | | | 0.1 | 0.1 | 0.1 |
| Diacetylene tetraol compound [232] | | | | | | | | | | | |
| Diacetylene tetraol compound [233] | | | | | | | | | | | |
| Diacetylene tetraol compound [240] | | | | | | | | | | | |
| Diacetylene tetraol compound [241] | | | | | | | | | | | |
| Diacetylene tetraol compound [242] | | | | | | | | | | | |
| Diacetylene tetraol compound [243] | | | | | | | | | | | |

TABLE 8-continued

|  | | | | | | | | | | | |
|---|---|---|---|---|---|---|---|---|---|---|---|
| EH2G [2G] | | | | | | | | | | | |
| EH3G [3G] | | | | | | | | | | | |
| EH4G [4G] | | | 3.0 | | | 3.0 | | | 3.0 | | |
| EH6G [6G] | 3.0 | | | 3.0 | | | 3.0 | | | 3.0 | |
| EH8G [8G] | | 3.0 | | | 3.0 | | | 3.0 | | | 3.0 |
| EH9G [9G] | | | | | | | | | | | |
| EH10G [10G] | | | | | | | | | | | |
| Triethylene glycol mono butyl ether | 7.0 | 7.0 | 7.0 | 7.0 | 7.0 | 7.0 | 7.0 | 7.0 | 7.0 | 7.0 | 7.0 |
| Glycerin | 10.0 | 10.0 | 10.0 | 10.0 | 10.0 | 10.0 | 10.0 | 10.0 | 10.0 | 10.0 | 10.0 |
| Triethylene glycol | 10.0 | 10.0 | 10.0 | 10.0 | 10.0 | 10.0 | 10.0 | 10.0 | 10.0 | 10.0 | 10.0 |
| Triethanolamine | 0.5 | 0.5 | 0.5 | 0.5 | 0.5 | 0.5 | 0.5 | 0.5 | 0.5 | 0.5 | 0.5 |
| Dye A | 1.0 | 1.0 | 1.0 | 1.0 | 1.0 | 1.0 | 1.0 | 1.0 | 1.0 | 1.0 | 1.0 |
| Ultrafiltered water | 68.4 | 68.4 | 68.4 | 68.4 | 68.4 | 68.4 | 68.4 | 68.4 | 68.4 | 68.4 | 68.4 |
| Total | 100.0 | 100.0 | 100.0 | 100.0 | 100.0 | 100.0 | 100.0 | 100.0 | 100.0 | 100.0 | 100.0 |
| Bubble elimination [8] | 2 | 2 | 2 | 2 | 2 | 2 | 2 | 2 | 2 | 2 | 2 |
| Solution stability [9] | 4 | 3 | 4 | 4 | 4 | 3 | 3 | 3 | 3 | 3 | 3 |

TABLE 9

| Materials | Comparative Examples | | | | | | | | | | | | | | | | | | | | | | | |
|---|---|---|---|---|---|---|---|---|---|---|---|---|---|---|---|---|---|---|---|---|---|---|---|---|
| | 134 | 135 | 136 | 137 | 138 | 139 | 140 | 141 | 142 | 143 | 144 | 145 | 146 | 147 | 148 | 149 | 150 | 151 | 152 | 153 | 154 | 155 | 156 | 157 |
| Diacetylene tetraol compound [300] | 0.1 | | | | | | | | | | | | | | | | | | | | | | | |
| Diacetylene tetraol compound [301] | | 0.1 | | | | | | | | | | | | | | | | | | | | | | |
| Diacetylene tetraol compound [302] | | | 0.1 | | | | | | | | | | | | | | | | | | | | | |
| Diacetylene tetraol compound [303] | | | | 0.1 | | | | | | | | | | | | | | | | | | | | |
| Diacetylene tetraol compound [310] | | | | | 0.1 | | | | | | | | | | | | | | | | | | | |
| Diacetylene tetraol compound [311] | | | | | | 0.1 | | | | | | | | | | | | | | | | | | |
| Diacetylene tetraol compound [312] | | | | | | | 0.1 | | | | | | | | | | | | | | | | | |
| Diacetylene tetraol compound [313] | | | | | | | | 0.1 | | | | | | | | | | | | | | | | |
| Diacetylene tetraol compound [320] | | | | | | | | | 0.1 | | | | | | | | | | | | | | | |
| Diacetylene tetraol compound [321] | | | | | | | | | | 0.1 | | | | | | | | | | | | | | |
| Diacetylene tetraol compound [322] | | | | | | | | | | | 0.1 | | | | | | | | | | | | | |
| Diacetylene tetraol compound [323] | | | | | | | | | | | | 0.1 | | | | | | | | | | | | |
| Diacetylene tetraol compound [330] | | | | | | | | | | | | | 0.1 | | | | | | | | | | | |
| Diacetylene tetraol compound [331] | | | | | | | | | | | | | | 0.1 | | | | | | | | | | |
| Diacetylene tetraol compound [332] | | | | | | | | | | | | | | | 0.1 | | | | | | | | | |
| Diacetylene tetraol compound [333] | | | | | | | | | | | | | | | | 0.1 | | | | | | | | |
| Diacetylene tetraol compound [340] | | | | | | | | | | | | | | | | | 0.1 | | | | | | | |
| Diacetylene tetraol compound [341] | | | | | | | | | | | | | | | | | | 0.1 | | | | | | |
| Diacetylene tetraol compound [342] | | | | | | | | | | | | | | | | | | | 0.1 | | | | | |
| Diacetylene tetraol compound [343] | | | | | | | | | | | | | | | | | | | | 0.1 | | | | |
| EH2G [2G] | 3.0 | | | | | | | | | | | | | | | | | | | | 0.1 | | | |
| EH3G [3G] | | 3.0 | | | | | | | | | | | | | | | | | | | | 0.1 | | |
| EH4G [4G] | | | 3.0 | | | | | | | | | | | | | | | | | | | | 0.1 | |
| EH6G [6G] | | | | 3.0 | | | | | | | | | | | | | | | | | | | | 0.1 |
| EH8G [8G] | | | | | 3.0 | | | | | | | | | | | | | | | 3.0 | 3.0 | 3.0 | 3.0 | 3.0 |
| EH9G [9G] | | | | | | 3.0 | | | | | | | | | | | | | 3.0 | | | | | |
| EH10G [10G] | | | | | | | 3.0 | 3.0 | 3.0 | 3.0 | 3.0 | 3.0 | 3.0 | 3.0 | 3.0 | 3.0 | 3.0 | 3.0 | | | | | | |
| Triethylene glycol mono butyl ether | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 |
| Glycerin | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 |
| Triethylene glycol | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 |
| Triethanolamine | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| Dye A | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| Ultrafiltered water | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 |
| Total | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 |
| Bubble elimination [8] | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| Solution stability [9] | 3 | 3 | 3 | 3 | 3 | 3 | 3 | 3 | 3 | 3 | 3 | 3 | 3 | 3 | 3 | 3 | 3 | 3 | 3 | 3 | 3 | 3 | 3 | 3 |

TABLE 10

| Materials | Comparative Examples | | | | | | | | | | | | | | | | | | | | | | | |
|---|---|---|---|---|---|---|---|---|---|---|---|---|---|---|---|---|---|---|---|---|---|---|---|---|
| | 158 | 159 | 160 | 161 | 162 | 163 | 164 | 165 | 166 | 167 | 168 | 169 | 170 | 171 | 172 | 173 | 174 | 175 | 176 | 177 | 178 | 179 | 180 | 181 |
| Diacetylene tetraol compound [300] | 0.1 | | | | | | | | | | | | | | | | | | | | | | | |
| Diacetylene tetraol compound [301] | | 0.1 | | | | | | | | | | | | | | | | | | | | | | |
| Diacetylene tetraol compound [302] | | | 0.1 | | | | | | | | | | | | | | | | | | | | | |
| Diacetylene tetraol compound [303] | | | | 0.1 | | | | | | | | | | | | | | | | | | | | |
| Diacetylene tetraol compound [310] | | | | | 0.1 | | | | | | | | | | | | | | | | | | | |
| Diacetylene tetraol compound [311] | | | | | | 0.1 | | | | | | | | | | | | | | | | | | |
| Diacetylene tetraol compound [312] | | | | | | | 0.1 | | | | | | | | | | | | | | | | | |
| Diacetylene tetraol compound [313] | | | | | | | | 0.1 | | | | | | | | | | | | | | | | |
| Diacetylene tetraol compound [320] | | | | | | | | | 0.1 | | | | | | | | | | | | | | | |
| Diacetylene tetraol compound [321] | | | | | | | | | | 0.1 | | | | | | | | | | | | | | |
| Diacetylene tetraol compound [322] | | | | | | | | | | | 0.1 | | | | | | | | | | | | | |
| Diacetylene tetraol compound [323] | | | | | | | | | | | | 0.1 | | | | | | | | | | | | |
| Diacetylene tetraol compound [330] | | | | | | | | | | | | | 0.1 | | | | | | | | | | | |
| Diacetylene tetraol compound [331] | | | | | | | | | | | | | | 0.1 | | | | | | | | | | |
| Diacetylene tetraol compound [332] | | | | | | | | | | | | | | | 0.1 | | | | | | | | | |
| Diacetylene tetraol compound [333] | | | | | | | | | | | | | | | | 0.1 | | | | | | | | |
| Diacetylene tetraol compound [340] | | | | | | | | | | | | | | | | | 0.1 | | | | | | | |
| Diacetylene tetraol compound [341] | | | | | | | | | | | | | | | | | | 0.1 | | | | | | |
| Diacetylene tetraol compound [342] | | | | | | | | | | | | | | | | | | | 0.1 | | | | | |
| Diacetylene tetraol compound [343] | | | | | | | | | | | | | | | | | | | | 0.1 | | | | |
| EH2G [2G] | 3.0 | | | | | | | 3.0 | | | | | | | | | | | | | | | | |
| EH3G [3G] | | 3.0 | | | | | | | 3.0 | | | | | | | | | | | | | | | |
| EH4G [4G] | | | 3.0 | | | | | | | 3.0 | | | | | | | | | | | 3.0 | | | |
| EH6G [6G] | | | | 3.0 | | | | | | | 3.0 | | | | | | | | | | | 3.0 | | |
| EH8G [8G] | | | | | 3.0 | | | | | | | 3.0 | | | | | 3.0 | | | | 0.1 | | | |
| EH9G [9G] | | | | | | 3.0 | | | | | | | 3.0 | | | | | 3.0 | | | | 0.1 | | |
| EH10G [10G] | | | | | | | 3.0 | | | | | | | 3.0 | 3.0 | 3.0 | | | 3.0 | 3.0 | | | 3.0 | 3.0 |
| Triethylene glycol mono butyl ether | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 |
| Glycerin | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 |
| Triethylene glycol | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 |
| Triethanolamine | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| Dye A | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| Ultrafiltered water | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 |
| Total | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 |
| Bubble elimination [8] | 1 | 1 | 1 | 1 | 1 | 1 | 1 | 1 | 1 | 1 | 1 | 1 | 1 | 2 | 2 | 3 | 2 | 2 | 2 | 1 | 1 | 1 | 1 | 1 |
| Solution stability [9] | 3 | 3 | 3 | 4 | 3 | 3 | 3 | 3 | 3 | 3 | 3 | 3 | 3 | 2 | 2 | 3 | 3 | 3 | 3 | 3 | 3 | 3 | 3 | 3 |

TABLE 11

| Materials | Comparative Examples | | | | | | | | | | | | | | | | | | | | | | | |
|---|---|---|---|---|---|---|---|---|---|---|---|---|---|---|---|---|---|---|---|---|---|---|---|---|
| | 182 | 183 | 184 | 185 | 186 | 187 | 188 | 189 | 190 | 191 | 192 | 193 | 194 | 195 | 196 | 197 | 198 | 199 | 200 | 201 | 202 | 203 | 204 | 205 |
| Diacetylene tetraol compound [300] | | | | | | | | | | | | | | | | | | | | | | | | |
| Diacetylene tetraol compound [301] | | | | | | | | | | | | | | | | | | | | | | | | |
| Diacetylene tetraol compound [302] | | | | | | | | | | | | | | | | | | | | | | | | |
| Diacetylene tetraol compound [303] | | | | | | | | | | | | | | | | | | | | | | | | |
| Diacetylene tetraol compound [310] | | | | | | | | | | | | | | | | | | | | | | | | |
| Diacetylene tetraol compound [311] | | | | | | | | | | | | | | | | | | | | | | | | |
| Diacetylene tetraol compound [312] | | | | | | | | | | | | | | | | | | | | | | | | |
| Diacetylene tetraol compound [313] | | | | | | | | | | | | | | | | | | | | | | | | |
| Diacetylene tetraol compound [320] | | | | | | | | | | | | | | | | | | | | | | | | |
| Diacetylene tetraol compound [321] | | | | | | | | | | | | | | | | | | | | | | | | |
| Diacetylene tetraol compound [322] | | | | | | | | | | | | | | | | | | | | | | | | |
| Diacetylene tetraol compound [323] | | | | | | | | | | | | | | | | | | | | | | | | |
| Diacetylene tetraol compound [330] | | | | | | | | | | | | | | | | | | | | | | | | |
| Diacetylene tetraol compound [331] | | | | | | | | | | | | | | | | | | | | | | | | |
| Diacetylene tetraol compound [332] | | | | | | | | | | | | | | | | | | | | | | | | |
| Diacetylene tetraol compound [333] | 0.1 | | | | | | | | | | | | | | | | | | | | | | | |
| Diacetylene tetraol compound [340] | | 0.1 | | | | | | | | | | | | | | | | | | | | | | |
| Diacetylene tetraol compound [341] | | | 0.1 | | | | | | | | | | | | | | | | | | | | | |
| Diacetylene tetraol compound [342] | | | | 0.1 | | | | | | | | | | | | | | | | | | | | |
| Diacetylene tetraol compound [343] | | | | | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| EH2G [2G] | 3.0 | | | | | | | | | | | | | | | | | | | | | | | |
| EH3G [3G] | | 3.0 | | | | | | | | | | | | | | | | | | | | | | |
| EH4G [4G] | | | 3.0 | | | | | | | | | | | | | | | | | | | | | |
| EH6G [6G] | | | | 3.0 | 3.0 | | | | | | | | | | | | | | | | | | | |
| EH8G [8G] | | | | | | 3.0 | | | | | | | | | | | | | | | | | | |
| EH9G [9G] | | | | | | | 3.0 | | | | | | | | | | | | | | | | | |
| EH10G [10G] | | | | | | | | 3.0 | 3.0 | | | | | | | | | | | | | | | |
| | | | | | | | | | | 3.0 | 3.0 | 3.0 | 3.0 | 3.0 | 3.0 | 3.0 | 3.0 | 3.0 | 3.0 | 3.0 | 3.0 | 3.0 | 3.0 | 3.0 |
| Triethylene glycol mono butyl ether | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 |
| Glycerin | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 |
| Triethylene glycol | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 |
| Triethanolamine | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| Dye A | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| Ultrafiltered water | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 |
| Total | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 |
| Bubble elimination [8] | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| Solution stability [9] | 1 | 1 | 1 | 1 | 1 | 1 | 1 | 1 | 1 | 1 | 1 | 1 | 1 | 1 | 1 | 1 | 2 | 2 | 2 | 2 | 2 | 2 | 2 | 2 |

TABLE 12

| Materials | Comparative Examples | | | | | | Examples | | | | | | | | | | | | | | | | | |
|---|---|---|---|---|---|---|---|---|---|---|---|---|---|---|---|---|---|---|---|---|---|---|---|---|
| | 206 | 207 | 208 | 209 | 210 | 211 | 50 | 51 | 52 | 53 | 54 | 55 | 56 | 57 | 58 | 59 | 60 | 61 | 62 | 63 | 64 | 65 | 66 | 67 |
| Diacetylene tetraol compound [300] | | | | | | | | | | | | | | | | | | | | | | | | |
| Diacetylene tetraol compound [301] | | | | | | | | | | | | | | | | | | | | | | | | |
| Diacetylene tetraol compound [302] | | | | | | | | | | | | | | | | | | | | | | | | |
| Diacetylene tetraol compound [303] | | | | | | | | | | | | | | | | | | | | | | | | |
| Diacetylene tetraol compound [310] | | | | | | | | | | | | | | | | | | | | | | | | |
| Diacetylene tetraol compound [311] | | | | | | | | | | | | | 0.1 | | | | | | | | | | |
| Diacetylene tetraol compound [312] | | | | | | | | | | | | | | 0.1 | 0.1 | | | | | | | | | |
| Diacetylene tetraol compound [313] | | | | | | | | | | | | | 0.1 | | | | | | | | | | | |
| Diacetylene tetraol compound [320] | | | | | | | 0.1 | | | | | | | | | | | | | | | | | |
| Diacetylene tetraol compound [321] | | | | | | | | 0.1 | | | | | | | | | | | | | | | | |
| Diacetylene tetraol compound [322] | | | | | | | | | 0.1 | | | | | | | | | | | | | | | |
| Diacetylene tetraol compound [323] | | | | | | | | | | 0.1 | | | | | | | | | | | | | | |
| Diacetylene tetraol compound [330] | | | | | | | | | | | 0.1 | | | | | | | | | | | | | |
| Diacetylene tetraol compound [331] | | | | | | | | | | | | 0.1 | | | | | | | | | | | | |
| Diacetylene tetraol compound [332] | | | | | | | | | | | | | | | | 0.1 | | | | | | | | |
| Diacetylene tetraol compound [333] | | | | | | | | | | | | | | | | | 0.1 | | | | | | | |
| Diacetylene tetraol compound [340] | | | | | | | | | | | | | | | | | | 0.1 | | | | | | |
| Diacetylene tetraol compound [341] | | | | | | | | | | | | | | | | | | | 0.1 | | | | | |
| Diacetylene tetraol compound [342] | | | | | | | | | | | | | | | | | | | | 0.1 | 0.1 | | | |
| Diacetylene tetraol compound [343] | | | | | | | | | | | | | | | | | | | | | | 0.1 | 0.1 | 0.1 |
| EH2G [2G] | 0.1 | | | | | | | | | | | | | | | | | | | | | | | |
| EH3G [3G] | 3.0 | 0.1 | | | | | | | | | | | | | | | | | | | | | | |
| EH4G [4G] | | 3.0 | 0.1 | | | | | | | | | | | | | | | | | | | | | |
| EH6G [6G] | | | 3.0 | 0.1 | | | 3.0 | 3.0 | 3.0 | 3.0 | 3.0 | 3.0 | 3.0 | 3.0 | 3.0 | 3.0 | 3.0 | 3.0 | 3.0 | 3.0 | 3.0 | 3.0 | 3.0 | 3.0 |
| EH8G [8G] | | | | 3.0 | 0.1 | | | | | | | | | | | | | | | | | | | |
| EH9G [9G] | | | | | 3.0 | 0.1 | | | | | | | | | | | | | | | | | | |
| EH10G [10G] | | | | | | 3.0 | | | | | | | | | | | | | | | | | | |
| Triethylene glycol mono butyl ether | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 |
| Glycerin | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 |
| Triethylene glycol | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 |
| Triethanolamine | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| Dye A | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| Ultrafiltered water | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 | 68.4 |
| Total | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 |
| Bubble elimination [8] | 1 | 1 | 1 | 1 | 1 | 1 | 2 | 2 | 2 | 3 | 3 | 3 | 2 | 2 | 2 | 2 | 2 | 2 | 3 | 3 | 3 | 2 | 2 | 2 |
| Solution stability [9] | 2 | 2 | 2 | 2 | 2 | 2 | 2 | 2 | 2 | 3 | 3 | 3 | 3 | 3 | 3 | 2 | 2 | 2 | 3 | 3 | 3 | 3 | 3 | 3 |

TABLE 13

| Materials | Examples | | | | | | | | |
|---|---|---|---|---|---|---|---|---|---|
| | 68 | 69 | 70 | 71 | 72 | 73 | 74 | 75 | 76 |
| Diacetylene tetraol compound [300] | | | | | | | | | |
| Diacetylene tetraol compound [301] | | | | | | | | | |
| Diacetylene tetraol compound [302] | | | | | | | | | |
| Diacetylene tetraol compound [303] | | | | | | | | | |
| Diacetylene tetraol compound [310] | | | | | | | | | |
| Diacetylene tetraol compound [311] | 0.1 | 0.1 | 0.1 | | | | | | |
| Diacetylene tetraol compound [312] | | | | | | | | | |
| Diacetylene tetraol compound [313] | | | | | | | | | |
| Diacetylene tetraol compound [320] | | | | 0.1 | 0.1 | 0.1 | | | |
| Diacetylene tetraol compound [321] | | | | | | | | | |
| Diacetylene tetraol compound [322] | | | | | | | | | |
| Diacetylene tetraol compound [323] | | | | | | | | | |
| Diacetylene tetraol compound [330] | | | | | | | 0.1 | 0.1 | 0.1 |
| Diacetylene tetraol compound [331] | | | | | | | | | |
| Diacetylene tetraol compound [332] | | | | | | | | | |
| Diacetylene tetraol compound [333] | | | | | | | | | |
| Diacetylene tetraol compound [340] | | | | | | | | | |
| Diacetylene tetraol compound [341] | | | | | | | | | |
| Diacetylene tetraol compound [342] | | | | | | | | | |
| Diacetylene tetraol compound [343] | | | | | | | | | |
| EH2G [2G] | | | | | | | | | |
| EH3G [3G] | | | | | | | | | |
| EH4G [4G] | 3.0 | | | 3.0 | | | 3.0 | | |
| EH6G [6G] | | 3.0 | | | 3.0 | | | 3.0 | |
| EH8G [8G] | | | 3.0 | | | 3.0 | | | 3.0 |
| EH9G [9G] | | | | | | | | | |
| EH10G [10G] | | | | | | | | | |
| Triethylene glycol mono butyl ether | 7.0 | 7.0 | 7.0 | 7.0 | 7.0 | 7.0 | 7.0 | 7.0 | 7.0 |
| Glycerin | 10.0 | 10.0 | 10.0 | 10.0 | 10.0 | 10.0 | 10.0 | 10.0 | 10.0 |
| Triethylene glycol | 10.0 | 10.0 | 10.0 | 10.0 | 10.0 | 10.0 | 10.0 | 10.0 | 10.0 |
| Triethanolamine | 0.5 | 0.5 | 0.5 | 0.5 | 0.5 | 0.5 | 0.5 | 0.5 | 0.5 |
| Dye A | 1.0 | 1.0 | 1.0 | 1.0 | 1.0 | 1.0 | 1.0 | 1.0 | 1.0 |
| Ultrafiltered water | 68.4 | 68.4 | 68.4 | 68.4 | 68.4 | 68.4 | 68.4 | 68.4 | 68.4 |
| Total | 100.0 | 100.0 | 100.0 | 100.0 | 100.0 | 100.0 | 100.0 | 100.0 | 100.0 |
| Bubble elimination [8] | 2 | 2 | 2 | 2 | 2 | 2 | 2 | 2 | 2 |
| Solution stability [9] | 3 | 3 | 3 | 3 | 3 | 3 | 3 | 3 | 3 |

TABLE 14

| Materials | Comparative Examples | | | | | | | | | | |
|---|---|---|---|---|---|---|---|---|---|---|---|
| | 212 | 213 | 214 | 215 | 216 | 217 | 218 | 219 | 220 | 221 | 222 |
| Diacetylene tetraol compound [400] | | | | | | | | | | | |
| Diacetylene tetraol compound [401] | | | | | | | | | | | |
| Diacetylene tetraol compound [402] | | | | | | | | | | | |
| Diacetylene tetraol compound [403] | | | | | | | | | | | |
| Diacetylene tetraol compound [410] | | | | | | | | | | | |
| Diacetylene tetraol compound [411] | | | | | | | | | | | |
| Diacetylene tetraol compound [412] | | | | | | | | | | | |
| Diacetylene tetraol compound [413] | | | | | | | | | | | |
| Diacetylene tetraol compound [420] | | | | | | | | | | | |
| Diacetylene tetraol compound [421] | | | | | | | | | | | |
| Diacetylene tetraol compound [422] | | | | | | | | | | | |
| Diacetylene tetraol compound [423] | | | | | | | | | | | |
| Diacetylene tetraol compound [430] | 0.1 | 0.1 | 0.1 | 0.1 | 0.1 | 0.1 | 0.1 | | | | |
| Diacetylene tetraol compound [431] | | | | | | | | 0.1 | 0.1 | 0.1 | 0.1 |
| Diacetylene tetraol compound [432] | | | | | | | | | | | |
| Diacetylene tetraol compound [433] | | | | | | | | | | | |
| Diacetylene tetraol compound [440] | | | | | | | | | | | |
| Diacetylene tetraol compound [441] | | | | | | | | | | | |
| Diacetylene tetraol compound [442] | | | | | | | | | | | |
| Diacetylene tetraol compound [443] | | | | | | | | | | | |
| EH2G [2G] | 3.0 | | | | | | | 3.0 | | | |
| EH3G [3G] | | 3.0 | | | | | | | 3.0 | | |
| EH4G [4G] | | | 3.0 | | | | | | | | |
| EH6G [6G] | | | | 3.0 | | | | | | | |
| EH8G [8G] | | | | | 3.0 | | | | | | |
| EH9G [9G] | | | | | | 3.0 | | | | 3.0 | |
| EH10G [10G] | | | | | | | 3.0 | | | | 3.0 |
| Triethylene glycol mono butyl ether | 7.0 | 7.0 | 7.0 | 7.0 | 7.0 | 7.0 | 7.0 | 7.0 | 7.0 | 7.0 | 7.0 |

TABLE 14-continued

| Material | | | | | | | | | | | |
|---|---|---|---|---|---|---|---|---|---|---|---|
| Glycerin | 10.0 | 10.0 | 10.0 | 10.0 | 10.0 | 10.0 | 10.0 | 10.0 | 10.0 | 10.0 | 10.0 |
| Triethylene glycol | 10.0 | 10.0 | 10.0 | 10.0 | 10.0 | 10.0 | 10.0 | 10.0 | 10.0 | 10.0 | 10.0 |
| Triethanolamine | 0.5 | 0.5 | 0.5 | 0.5 | 0.5 | 0.5 | 0.5 | 0.5 | 0.5 | 0.5 | 0.5 |
| Dye A | 1.0 | 1.0 | 1.0 | 1.0 | 1.0 | 1.0 | 1.0 | 1.0 | 1.0 | 1.0 | 1.0 |
| Ultrafiltered water | 68.4 | 68.4 | 68.4 | 68.4 | 68.4 | 68.4 | 68.4 | 68.4 | 68.4 | 68.4 | 68.4 |
| Total | 100.0 | 100.0 | 100.0 | 100.0 | 100.0 | 100.0 | 100.0 | 100.0 | 100.0 | 100.0 | 100.0 |
| Bubble elimination [8] | 1 | 1 | 1 | 1 | 1 | 1 | 1 | 1 | 1 | 1 | 1 |
| Solution stability [9] | 1 | 1 | 1 | 1 | 1 | 1 | 1 | 1 | 1 | 1 | 1 |

| Materials | Comparative Examples | | | | | | | | | |
|---|---|---|---|---|---|---|---|---|---|---|
| | 223 | 224 | 225 | 226 | 227 | 228 | 229 | 230 | 231 | 232 |
| Diacetylene tetraol compound [400] | | | | | | | | | | |
| Diacetylene tetraol compound [401] | | | | | | | | | | |
| Diacetylene tetraol compound [402] | | | | | | | | | | |
| Diacetylene tetraol compound [403] | | | | | | | | | | |
| Diacetylene tetraol compound [410] | | | | | | | | | | |
| Diacetylene tetraol compound [411] | | | | | | | | | | |
| Diacetylene tetraol compound [412] | | | | | | | | | | |
| Diacetylene tetraol compound [413] | | | | | | | | | | |
| Diacetylene tetraol compound [420] | | | | | | | | | | |
| Diacetylene tetraol compound [421] | | | | | | | | | | |
| Diacetylene tetraol compound [422] | | | | | | | | | | |
| Diacetylene tetraol compound [423] | | | | | | | | | | |
| Diacetylene tetraol compound [430] | | | | | | | | | | |
| Diacetylene tetraol compound [431] | | | | | 0.1 | 0.1 | 0.1 | | | |
| Diacetylene tetraol compound [432] | 0.1 | 0.1 | 0.1 | 0.1 | | | | 0.1 | 0.1 | 0.1 |
| Diacetylene tetraol compound [433] | | | | | | | | | | |
| Diacetylene tetraol compound [440] | | | | | | | | | | |
| Diacetylene tetraol compound [441] | | | | | | | | | | |
| Diacetylene tetraol compound [442] | | | | | | | | | | |
| Diacetylene tetraol compound [443] | | | | | | | | | | |
| EH2G [2G] | 3.0 | | | | | | | | | |
| EH3G [3G] | | 3.0 | | | | | | | | |
| EH4G [4G] | | | | | 3.0 | | | 3.0 | | |
| EH6G [6G] | | | | | | 3.0 | | | 3.0 | |
| EH8G [8G] | | | | | | | 3.0 | | | 3.0 |
| EH9G [9G] | | | 3.0 | | | | | | | |
| EH10G [10G] | | | | 3.0 | | | | | | |
| Triethylene glycol mono butyl ether | 7.0 | 7.0 | 7.0 | 7.0 | 7.0 | 7.0 | 7.0 | 7.0 | 7.0 | 7.0 |
| Glycerin | 10.0 | 10.0 | 10.0 | 10.0 | 10.0 | 10.0 | 10.0 | 10.0 | 10.0 | 10.0 |
| Triethylene glycol | 10.0 | 10.0 | 10.0 | 10.0 | 10.0 | 10.0 | 10.0 | 10.0 | 10.0 | 10.0 |
| Triethanolamine | 0.5 | 0.5 | 0.5 | 0.5 | 0.5 | 0.5 | 0.5 | 0.5 | 0.5 | 0.5 |
| Dye A | 1.0 | 1.0 | 1.0 | 1.0 | 1.0 | 1.0 | 1.0 | 1.0 | 1.0 | 1.0 |
| Ultrafiltered water | 68.4 | 68.4 | 68.4 | 68.4 | 68.4 | 68.4 | 68.4 | 68.4 | 68.4 | 68.4 |
| Total | 100.0 | 100.0 | 100.0 | 100.0 | 100.0 | 100.0 | 100.0 | 100.0 | 100.0 | 100.0 |
| Bubble elimination [8] | 1 | 1 | 1 | 1 | 1 | 1 | 1 | 1 | 1 | 1 |
| Solution stability [9] | 1 | 1 | 1 | 1 | 1 | 1 | 1 | 1 | 1 | 1 |

TABLE 15

| Materials | Examples | | | | | | | |
|---|---|---|---|---|---|---|---|---|
| | 77 | 78 | 79 | 80 | 81 | 82 | 83 | 84 |
| Diacetylene tetraol compound [100] | | | | | | | | |
| Diacetylene tetraol compound [101] | | | | | | | | |
| Diacetylene tetraol compound [102] | | | | | | | | |
| Diacetylene tetraol compound [103] | | | | | | | | |
| Diacetylene tetraol compound [110] | 0.01 | 0.01 | 0.01 | 0.01 | 0.02 | 0.03 | 0.04 | 0.90 |
| Diacetylene tetraol compound [111] | | | | | | | | |
| Diacetylene tetraol compound [112] | | | | | | | | |
| Diacetylene tetraol compound [113] | | | | | | | | |
| Diacetylene tetraol compound [120] | | | | | | | | |
| Diacetylene tetraol compound [121] | | | | | | | | |
| Diacetylene tetraol compound [122] | | | | | | | | |
| Diacetylene tetraol compound [123] | | | | | | | | |
| Diacetylene tetraol compound [130] | | | | | | | | |
| Diacetylene tetraol compound [131] | | | | | | | | |
| Diacetylene tetraol compound [132] | | | | | | | | |
| Diacetylene tetraol compound [133] | | | | | | | | |
| Diacetylene tetraol compound [140] | | | | | | | | |
| Diacetylene tetraol compound [141] | | | | | | | | |

TABLE 15-continued

| Materials | | | | | | | | | |
|---|---|---|---|---|---|---|---|---|---|
| Diacetylene tetraol compound [142] | | | | | | | | | |
| Diacetylene tetraol compound [143] | | | | | | | | | |
| EH2G [2G] | | | | | | | | | |
| EH3G [3G] | | | | | | | | | |
| EH4G [4G] | | | | | | | | | |
| EH6G [6G] | | 0.25 | 0.50 | 0.75 | 1.00 | 2.00 | 3.00 | 4.00 | 8.50 |
| EH8G [8G] | | | | | | | | | |
| EH9G [9G] | | | | | | | | | |
| EH10G [10G] | | | | | | | | | |
| Triethylene glycol mono butyl ether | | 7.0 | 7.0 | 7.0 | 7.0 | 7.0 | 7.0 | 7.0 | 7.0 |
| Glycerin | | 10.0 | 10.0 | 10.0 | 10.0 | 10.0 | 10.0 | 10.0 | 10.0 |
| Triethylene glycol | | 10.0 | 10.0 | 10.0 | 10.0 | 10.0 | 10.0 | 10.0 | 10.0 |
| Triethanolamine | | 0.5 | 0.5 | 0.5 | 0.5 | 0.5 | 0.5 | 0.5 | 0.5 |
| Dye A | | 1.0 | 1.0 | 1.0 | 1.0 | 1.0 | 1.0 | 1.0 | 1.0 |
| Ultrafiltered water | | 71.2 | 71.0 | 70.7 | 70.5 | 69.5 | 68.5 | 67.5 | 62.1 |
| Total | | 100.0 | 100.0 | 100.0 | 100.0 | 100.0 | 100.0 | 100.0 | 100.0 |
| Maximum stable spraying speed | [m/s] | 14 | 14 | 15 | 15 | 14 | 15 | 15 | 10 |
| Minimum stable flying speed | [m/s] | 6 | 6 | 5 | 5 | 6 | 5 | 5 | 5 |
| Stable range | [m/s] | 8 | 8 | 10 | 10 | 8 | 10 | 10 | 5 |
| Bubble elimination [8] | — | 1 | 1 | 1 | 2 | 2 | 2 | 2 | 2 |
| Solution stability [9] | — | 1 | 1 | 1 | 1 | 1 | 1 | 2 | 5 |

| | | Examples | | | | | | | |
|---|---|---|---|---|---|---|---|---|---|
| Materials | | 85 | 86 | 87 | 88 | 89 | 90 | 91 | 92 |
| Diacetylene tetraol compound [100] | | | | | | | | | |
| Diacetylene tetraol compound [101] | | | | | | | | | |
| Diacetylene tetraol compound [102] | | | | | | | | | |
| Diacetylene tetraol compound [103] | | | | | | | | | |
| Diacetylene tetraol compound [110] | | 1.00 | 0.05 | 0.10 | 0.20 | 0.40 | 0.60 | 0.70 | 0.80 |
| Diacetylene tetraol compound [111] | | | | | | | | | |
| Diacetylene tetraol compound [112] | | | | | | | | | |
| Diacetylene tetraol compound [113] | | | | | | | | | |
| Diacetylene tetraol compound [120] | | | | | | | | | |
| Diacetylene tetraol compound [121] | | | | | | | | | |
| Diacetylene tetraol compound [122] | | | | | | | | | |
| Diacetylene tetraol compound [123] | | | | | | | | | |
| Diacetylene tetraol compound [130] | | | | | | | | | |
| Diacetylene tetraol compound [131] | | | | | | | | | |
| Diacetylene tetraol compound [132] | | | | | | | | | |
| Diacetylene tetraol compound [133] | | | | | | | | | |
| Diacetylene tetraol compound [140] | | | | | | | | | |
| Diacetylene tetraol compound [141] | | | | | | | | | |
| Diacetylene tetraol compound [142] | | | | | | | | | |
| Diacetylene tetraol compound [143] | | | | | | | | | |
| EH2G [2G] | | | | | | | | | |
| EH3G [3G] | | | | | | | | | |
| EH4G [4G] | | | | | | | | | |
| EH6G [6G] | | 9.00 | 4.00 | 5.00 | 5.00 | 6.00 | 6.00 | 7.00 | 8.00 |
| EH8G [8G] | | | | | | | | | |
| EH9G [9G] | | | | | | | | | |
| EH10G [10G] | | | | | | | | | |
| Triethylene glycol mono butyl ether | | 7.0 | 7.0 | 7.0 | 7.0 | 7.0 | 7.0 | 7.0 | 7.0 |
| Glycerin | | 10.0 | 10.0 | 10.0 | 10.0 | 10.0 | 10.0 | 10.0 | 10.0 |
| Triethylene glycol | | 10.0 | 10.0 | 10.0 | 10.0 | 10.0 | 10.0 | 10.0 | 10.0 |
| Triethanolamine | | 0.5 | 0.5 | 0.5 | 0.5 | 0.5 | 0.5 | 0.5 | 0.5 |
| Dye A | | 1.0 | 1.0 | 1.0 | 1.0 | 1.0 | 1.0 | 1.0 | 1.0 |
| Ultrafiltered water | | 61.5 | 67.5 | 66.4 | 66.3 | 65.1 | 64.9 | 63.8 | 62.7 |
| Total | | 100.0 | 100.0 | 100.0 | 100.0 | 100.0 | 100.0 | 100.0 | 100.0 |
| Maximum stable spraying speed | [m/s] | 9 | 16 | 16 | 14 | 14 | 15 | 14 | 15 |
| Minimum stable flying speed | [m/s] | 5 | 5 | 6 | 4 | 5 | 5 | 5 | 5 |
| Stable range | [m/s] | 4 | 11 | 10 | 10 | 9 | 10 | 9 | 10 |
| Bubble elimination [8] | — | 2 | 3 | 3 | 3 | 3 | 3 | 3 | 3 |
| Solution stability [9] | — | 5 | 5 | 5 | 5 | 5 | 5 | 5 | 5 |

The structures of the diacetylene tetraol compounds in each table ($R_1$, $R_2$, k, l, m and n in general formula (1)) are shown in Table 16.

TABLE 16

| Remarks | R1 | R2 | K, l, m, n |
|---|---|---|---|
| [000] | 0 | 0 | 0 |
| [001] | 0 | 0 | 1 |
| [002] | 0 | 0 | 2 |
| [003] | 0 | 0 | 3 |
| [010] | 0 | 1 | 0 |
| [011] | 0 | 1 | 1 |
| [012] | 0 | 1 | 2 |
| [013] | 0 | 1 | 3 |
| [020] | 0 | 2 | 0 |
| [021] | 0 | 2 | 1 |
| [022] | 0 | 2 | 2 |
| [023] | 0 | 2 | 3 |
| [030] | 0 | 3 | 0 |
| [031] | 0 | 3 | 1 |
| [032] | 0 | 3 | 2 |
| [033] | 0 | 3 | 3 |
| [040] | 0 | 4 | 0 |
| [041] | 0 | 4 | 1 |
| [042] | 0 | 4 | 2 |
| [043] | 0 | 4 | 3 |
| [100] | 1 | 0 | 0 |
| [101] | 1 | 0 | 1 |
| [102] | 1 | 0 | 2 |
| [103] | 1 | 0 | 3 |
| [110] | 1 | 1 | 0 |
| [111] | 1 | 1 | 1 |
| [112] | 1 | 1 | 2 |
| [113] | 1 | 1 | 3 |
| [120] | 1 | 2 | 0 |
| [121] | 1 | 2 | 1 |
| [122] | 1 | 2 | 2 |
| [123] | 1 | 2 | 3 |
| [130] | 1 | 3 | 0 |
| [131] | 1 | 3 | 1 |
| [132] | 1 | 3 | 2 |
| [133] | 1 | 3 | 3 |
| [140] | 1 | 4 | 0 |
| [141] | 1 | 4 | 1 |
| [142] | 1 | 4 | 2 |
| [143] | 1 | 4 | 3 |
| [200] | 2 | 0 | 0 |
| [201] | 2 | 0 | 1 |
| [202] | 2 | 0 | 2 |
| [203] | 2 | 0 | 3 |
| [210] | 2 | 1 | 0 |
| [211] | 2 | 1 | 1 |
| [212] | 2 | 1 | 2 |
| [213] | 2 | 1 | 3 |
| [220] | 2 | 2 | 0 |
| [221] | 2 | 2 | 1 |
| [222] | 2 | 2 | 2 |
| [223] | 2 | 2 | 3 |
| [230] | 2 | 3 | 0 |
| [231] | 2 | 3 | 1 |
| [232] | 2 | 3 | 2 |
| [233] | 2 | 3 | 3 |
| [240] | 2 | 4 | 0 |
| [241] | 2 | 4 | 1 |
| [242] | 2 | 4 | 2 |
| [243] | 2 | 4 | 3 |
| [300] | 3 | 0 | 0 |
| [301] | 3 | 0 | 1 |
| [302] | 3 | 0 | 2 |
| [303] | 3 | 0 | 3 |
| [310] | 3 | 1 | 0 |
| [311] | 3 | 1 | 1 |
| [312] | 3 | 1 | 2 |
| [313] | 3 | 1 | 3 |
| [320] | 3 | 2 | 0 |
| [321] | 3 | 2 | 1 |
| [322] | 3 | 2 | 2 |
| [323] | 3 | 2 | 3 |
| [330] | 3 | 3 | 0 |
| [331] | 3 | 3 | 1 |
| [332] | 3 | 3 | 2 |
| [333] | 3 | 3 | 3 |
| [340] | 3 | 4 | 0 |
| [341] | 3 | 4 | 1 |
| [342] | 3 | 4 | 2 |
| [343] | 3 | 4 | 3 |
| [400] | 4 | 0 | 0 |
| [401] | 4 | 0 | 1 |
| [402] | 4 | 0 | 2 |
| [403] | 4 | 0 | 3 |
| [410] | 4 | 1 | 0 |
| [411] | 4 | 1 | 1 |
| [412] | 4 | 1 | 2 |
| [413] | 4 | 1 | 3 |
| [420] | 4 | 2 | 0 |
| [421] | 4 | 2 | 1 |
| [422] | 4 | 2 | 2 |
| [423] | 4 | 2 | 3 |
| [430] | 4 | 3 | 0 |
| [431] | 4 | 3 | 1 |
| [432] | 4 | 3 | 2 |
| [433] | 4 | 3 | 3 |
| [440] | 4 | 4 | 0 |
| [441] | 4 | 4 | 1 |
| [442] | 4 | 4 | 2 |
| [443] | 4 | 4 | 3 |

The details of the glycol ethers (EH2G through 10G) in each table are as shown below.

EH2G=Diethylene glycol mono-2-ethylhexyl ether
EH3G=Triethylene glycol mono-2-ethylhexyl ether
EH4G=Tetraethylene glycol mono-2-ethylhexyl ether
EH6G=Hexaethylene glycol mono-2-ethylhexyl ether
EH8G=Octaethylene glycol mono-2-ethylhexyl ether
EH9G=Nonaethylene glycol mono-2-ethylhexyl ether
EH10G=Decaethylene glycol mono-2-ethylhexyl ether Bubble Elimination A transparent ink channel prepared using cyclic olefin copolymer (hereunder called COC), an optical resin, was combined with an inkjet head so that it could be observed visually, and cleaned, and an ink composition of this configuration was fed into the inkjet head. This was left for one week at room temperature and cleaned again, and the volume of bubbles adhering inside the COC channel was graded on a scale from 5 to 1, with 5 being no bubbles and 1 being many bubbles.

When a small amount of coloring material was added to the ink composition of this configuration to confirm visibility and the discharge condition and printed material were observed, the greater the volume of adhering bubbles, the greater the likelihood of discharge deflection, resulting in problems in the printed material.

Solution Stability

Sealable glass containers were filled with the prepared liquid, and left for 3 days in a thermostatic tank at 50° C., 60° C., 70° C. and 80° C. These were then observed visually in the thermostatic tank in a liquid state to determine the temperature at which no cloudiness or separation occurred, and evaluated according to the following scale: 1=not dissolved at room temperature, 2=50° C., 3=60° C., 4=70° C., 5=not dissolved at a temperature above 80° C.

Flying Stability

The ink cartridges of an inkjet printer were filled with each of the ink compositions, and used to record on a recording medium with a PM-A750 inkjet printer (Seiko Epson, 25° C.

environment, Small dot waveform), with the flying speed of the ink droplets varied by varying the distortion factor of the piezoelectric element.

The maximum flying speed of the ink droplets at which the ink droplets did not separate into three or more either at the start of spraying or during flight was given as the maximum stable spraying speed (m/s), and the minimum flying speed at which they did not become single droplets and stall was given as the minimum stable flying speed (m/s). That is, the range at which they flew as two droplets was determined as the stable range between the maximum stable flying speed and the minimum stable flying speed.

The present invention is industrially applicable as an ink composition capable of providing normal discharge with fewer adverse effects from bubbles in the ink channel, an ink set using an ink composition having these properties, an ink-jet recording method and a beautiful recorded material obtained by this recording method.

What is claimed is:

1. An ink composition comprising, as essential components, at least a diacetylene tetraol compound represented by general formula (1) below and a glycol ether represented by general formula (2) below:

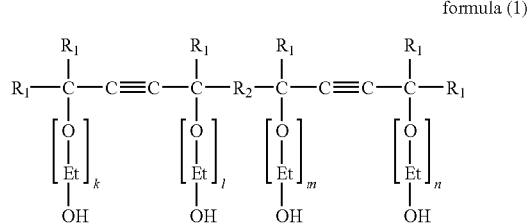

formula (1)

wherein $R_1$ and $R_2$ each independently represent $C_{1-3}$ alkyl groups; —O-Et- represents oxyethylene; and k, l, m and n are each integers from 0 to 2;

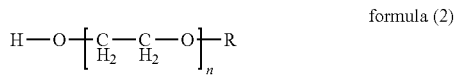

formula (2)

wherein R represents a $C_8$ alkyl group; and n is an integer from 4 to 8.

2. The ink composition according to claim 1, wherein the content of the diacetylene tetraol compound is 0.05 to 0.8 wt %.

3. The ink composition according to claim 1, wherein the content of the glycol ether is 1.5 to 8.0 wt %.

4. An ink set for use in inkjet recording, comprising at least an ink composition according to any of claims 1 through 3 as a structural component.

5. An ink cartridge filled with the ink composition according to any one of claims 1 through 3.

6. An inkjet recording method for recording, said method comprising discharging droplets of an ink composition and affixing the droplets to a recording medium, wherein the ink composition is defined according to any one of claims 1 through 3.

7. A recorded material printed by the inkjet recording method according to claim 6.

* * * * *